July 18, 1939.  W. BLACK  2,166,792
HYDRAULIC TORQUE CONVERTER
Filed March 17, 1938
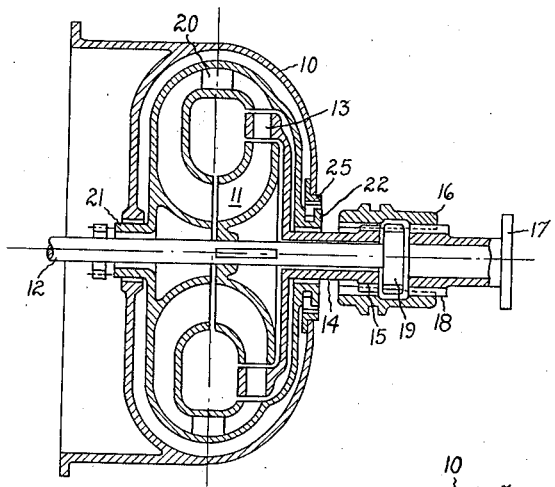
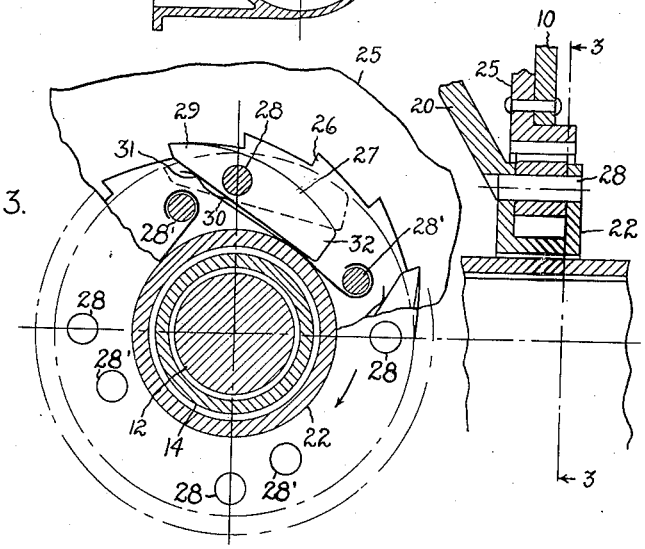
Inventor:
Willy Black,
by Harry E. Dunham
His Attorney.

Patented July 18, 1939

2,166,792

UNITED STATES PATENT OFFICE 2,166,792

HYDRAULIC TORQUE CONVERTER

Willy Black, Berlin-Halensee, Germany, assignor to General Electric Company, a corporation of New York Application March 17, 1938, Serial No. 196,529
In Germany March 20, 1937

2 Claims. (Cl. 60—54)

My invention relates to hydraulic torque converters and more particularly to an improved mechanical ratchet coupling between the guide wheel and the stationary casing of a hydraulic torque converter of the Föttinger type.

One object of my invention is to provide a noiseless coupling device of the ratchet type.

For a better understanding of my invention, together with other and further objects thereof, reference is had to the following description taken in connection with the accompanying drawing, and its scope will be pointed out in the appended claims.

In the accompanying drawing, Fig. 1 discloses a sectional elevation of a hydraulic torque converter embodying my invention; Fig. 2 is an enlarged fragmentary view of Fig. 1 illustrating my improved ratchet coupling, and Fig. 3 is a view looking in the direction of arrows 3—3 in Fig. 2.

Referring to the drawing in detail, Fig. 1 discloses a sectional view of a hydraulic torque converter of the Föttinger type disclosed in detail in U. S. Patents 1,199,359 and 1,199,360 comprising a stationary casing 10 within which a pump wheel 11 is mounted on a drive shaft 12 for rotation within the casing 10. A turbine wheel 13 provided with a hub 14 is mounted concentric with, and for rotation about, the drive shaft 12. The hollow shaft 14 is provided with a toothed flange 15 and by means of a sleeve 16 is coupled to a driven shaft 17. The driven shaft 17 is provided with teeth 18 which are normally engaged by cooperating teeth on the sleeve 16, so that a driving connection is obtained from the turbo wheel 13 to the driven shaft 17. A direct connection between the shafts 12 and 17 may be obtained by moving the sleeve 16 so that the teeth which normally engage only the teeth on the hollow shaft or hub 14, also engage the teeth on a gear wheel 19 attached to the end of the driving shaft 12. A third wheel 20 is provided in the casing 10 which for convenience we may call the guide wheel. This wheel is provided with a hub 21 mounted on the shaft 12, and with a second hub 22 mounted on the hollow shaft 14. This wheel is connected to the stationary casing 10 through a ratchet connection which is arranged to permit only unidirectional rotation of the guide wheel 20. In operation, this wheel guides fluid, received from the discharge end of the turbo wheel, back to the intake side of the pump wheel. When the sleeve 16 is in position to drive the shaft 17 from the turbo wheel flange 15, the fluid circulating between the pump and turbo wheels impinges upon the guide wheel vanes and tends to turn this guide wheel in a direction opposite to the movement of the turbo and pump wheels. The ratchet is arranged to prevent this movement. When the sleeve 16 is moved to make a direct connection between the shafts 12 and 17, the turbo and pump wheels are locked together and the fluid circulated thereby then tends to move the guide wheel in the same direction as that in which the pump and turbo wheels are moving, this movement being permitted by the ratchet.

The ratchet connection between the guide wheel 20 and the casing 10 is illustrated in enlarged cross-section in Fig. 2, and a side view thereof is shown in Fig. 3. This connection consists of a ring 25 mounted in the casing 10 and provided on its inner surface with teeth 26. Ratchet pawls 27 are supported by pivot pins 28 projecting through the hub 22 of the guide wheel 20. The forward end 29 of the ratchet pawls 27 are normally moved outwardly by springs 30 which are preferably leaf springs mounted at one end on a pin 28' and projecting forwardly to engage at its other end 31 the forward end 29 of a preceding pawl 27. The pins 28' are locked intermediate the pivot pins 28 and under the forward ends 29 of the pawls 27.

In accordance with my invention, each ratchet pawl is pivoted by a pin 28 forward of its center of gravity, so that its back end 32 which normally rests on the inner surface of hub 22 is of greater weight than its forward end 29 which engages a tooth 26 on the ring 25. When the guide wheel 20 rotates at a sufficiently great speed in the clockwise direction, looking at Fig. 3, centrifugal force will move the rear end of each pawl outwardly, overcoming the force of the spring 30 and moving the pawl end 29 completely out of contact with the cam surface 25. The pins 28' are mounted under the forward end of each succeeding pawl and prevent a turning of the pawl far enough for the rear end of the pawl to ride on the ratchet teeth. This prevents undue wear and noise normally caused by the forward ends of the ratchet teeth 26 as they ride over the end of each tooth of the cam surface 25.

What I claim as new and desire to secure by Letters Patent of the United States is:

1. In a hydraulic torque converter provided with a guide wheel, the combination of a ratchet device for effecting rotation of said guide wheel in only one direction, said ratchet comprising a stationary cam, pawls mounted on said guide wheel, pivots for said pawls located forward of the center of gravity of said pawls, leaf springs, anchor pins for supporting said leaf springs at one end arranged intermediate said pivot pins, said leaf springs being arranged to normally move the forward end of said pawls into engagement with said cam, the effect of said springs being overcome by the centrifugal force acting upon the unbalanced pawl whereby the pawl ends are prevented from riding over the cam surface during the rotation of said guide wheel and are moved inwardly, said inward movement being limited by said spring anchor pins respectively.

2. In a hydraulic torque converter provided with a guide wheel, the combination of a ratchet device effecting rotation of said guide wheel in only one direction, said ratchet comprising a stationary ring provided with ratchet teeth on its inner surface, pawls mounted on said guide wheel within said ring, pivots for said pawls located forward of the center of gravity of said pawls, leaf springs, pins positioned intermediate said pivot pins and underneath the forward ends of said pawls respectively, said springs being hooked at one end about said last mentioned pins respectively and projecting under the forward end of a preceding pawl, thereby normally moving the forward end of said pawl outwardly into engagement with said ratchet teeth, said spring pressure being overcome by centrifugal force acting upon the rear end of said unbalanced pawl so as to prevent the end of said pawl riding on said ratchet teeth during the rotation of said guide wheel.

WILLY BLACK.